United States Patent
Jesse

(10) Patent No.: US 7,617,809 B2
(45) Date of Patent: Nov. 17, 2009

(54) STARTING BRAKE FOR A HEDGE CLIPPER

(75) Inventor: Mark Jesse, Hamburg (DE)

(73) Assignee: Dolmar GmbH, Hamburg (DE)

( * ) Notice: Subject to any disclaimer, the term of this patent is extended or adjusted under 35 U.S.C. 154(b) by 210 days.

(21) Appl. No.: 11/718,950

(22) PCT Filed: Oct. 26, 2005

(86) PCT No.: PCT/DE2005/001917

§ 371 (c)(1),
(2), (4) Date: May 9, 2007

(87) PCT Pub. No.: WO2006/050689

PCT Pub. Date: May 18, 2006

(65) Prior Publication Data
US 2007/0295298 A1 Dec. 27, 2007

(30) Foreign Application Priority Data
Nov. 15, 2004 (DE) .................. 20 2004 017 679 U

(51) Int. Cl.
*F02N 3/02* (2006.01)
(52) U.S. Cl. .................................. 123/185.4
(58) Field of Classification Search ... 123/185.1–185.4, 123/198 D; 74/6; 185/39; 30/382, DIG. 5; 83/399, DIG. 1
See application file for complete search history.

(56) References Cited

U.S. PATENT DOCUMENTS

| | | | | | |
|---|---|---|---|---|---|
| 3,776,331 | A | * | 12/1973 | Gustafsson | .................. 188/166 |
| 4,006,528 | A | * | 2/1977 | Katsuya | ........................ 30/276 |
| 4,793,064 | A | * | 12/1988 | Nagashima | .................... 30/382 |
| 5,305,528 | A | * | 4/1994 | Garrison | ....................... 30/216 |
| 5,791,057 | A | * | 8/1998 | Nakamura et al. | ............. 30/381 |
| 5,947,866 | A | * | 9/1999 | Nagashima | ................. 477/200 |
| 6,021,757 | A | * | 2/2000 | Nagashima | ................. 123/400 |
| 6,094,822 | A | * | 8/2000 | Lange et al. | ................... 30/216 |
| 6,105,258 | A | * | 8/2000 | Akaike | .......................... 30/276 |
| 6,167,973 | B1 | * | 1/2001 | Nagashima | ................. 173/221 |
| 6,640,444 | B1 | | 11/2003 | Harada et al. | |
| 6,918,451 | B2 | * | 7/2005 | Nagashima et al. | .......... 173/221 |

FOREIGN PATENT DOCUMENTS

| | | |
|---|---|---|
| DE | 36 39 650 | 6/1988 |
| DE | 198 21 697 | 11/1998 |
| DE | 198 33 163 | 2/1999 |
| DE | 199 01 453 | 7/1999 |

* cited by examiner

*Primary Examiner*—Michael Cuff
*Assistant Examiner*—Ka Chun Leung
(74) *Attorney, Agent, or Firm*—Kelly Lowry & Kelley, LLP

(57) ABSTRACT

The invention relates to a work implement including a drive which can be started by a cable pull starter, wherein the cable pull starter has a starter handle which is located in a holder in a rest position and which can be removed from the holder by a user for starting the drive. The work implement also includes a starting brake for a tool which prevents tool movements hazardous to the user directly after starting the drive, wherein a tripping mechanism disposed on the holder is provided for the starting brake, which by removing the starter handle from the holder automatically tightens the starting brake.

10 Claims, 5 Drawing Sheets

STARTING BRAKE FOR A HEDGE CLIPPER

BACKGROUND OF THE INVENTION

The invention relates to a work implement, in particular a hedge clipper.

Work implements in the form of hedge clippers driven by an internal combustion engine have long been known. The internal combustion engine is started in a known manner by means of a cable pull starter. Such hedge clippers are known, for example, from DE 198 21 697 C2.

To start the drive, the user must pull the starter handle of the cable pull starter in a vigorous jerky movement. A starting brake is provided to prevent the cutting tools from being able to move during the starting process and possibly injuring the user. The starting brakes function in this case in such a manner that the starting brake tightens during the starting process; movements of the cutting tool are thus prevented during the starting process.

DE 36 39 650 A1 relates to a starting brake for a motor chain saw which can be actuated by means of a lever located in the handle section of the motor chain saw.

DE 198 08 118 C2 describes hedge clippers with a brake band guided around a brake drum, both ends whereof are connected to a brake lever which is tensioned by means of a brake spring and which brings the brake band to abut against the brake drum. A tripping lever for the brake comprising an adjusting cam which cooperates with the brake lever is arranged adjacent to the brake mechanism and can be actuated separately by the user.

The known brakes have the disadvantage that they must be controlled by the user actuating levers. This can lead to incorrect operation.

SUMMARY OF THE INVENTION

It is thus the object of the present invention to provide a starting brake mechanism for a work implement which is easy to handle and therefore reliable. The object is achieved by a work implement specified initially having the characterising features of claim 1.

The tripping mechanism for the starting brake according to the invention makes use of the fact that the starter handle is initially located in a rest position in which it is received in a holder. The starter handle must be removed from the holder to start the drive. This transferring of the starter handle to the starter position automatically triggers the tripping mechanism of the starting brake according to the invention. The starting brake is automatically tightened and the tool braked.

The starting brake is preferably triggered automatically by the tripping mechanism during automatic insertion of the starter handle into the holder after the drive, e.g. the two-stroke internal combustion engine, has been started and the tool is released.

Sources of error caused by incorrect handling of the starting brake by the user are almost completely eliminated by the tripping mechanism according to the invention. The work implement according to the invention is thus particularly reliable.

In a preferred embodiment of the invention, the tripping mechanism has an adjusting means which is in the rest position when the starter handle is introduced into the holder and changes into a starter position by withdrawing the starter handle from the holder. In the rest position, the adjusting means can be in contact with the starter handle, preferably with a fastening section for the starter cable of the starter handle and be held in a rest position by pressure contact. The pressure contact is released by withdrawing the starter handle and the adjusting means can change automatically to the starter position, preferably by means of a spring device in communication with the adjusting means.

The tripping mechanism according to the invention with a spring-pre-stressed adjusting means allows the starting brake to be controlled automatically in a cost-effective manner by withdrawing and introducing the starter handle into the holder.

The adjusting means is preferably disposed before the holder in the tightening direction of the starter handle. As a result, the holder known in the prior art need not be modified and the tripping mechanism according to the invention can be arranged cost-effectively by mounting separately before the holder.

In one variant of the invention, the adjusting means is embodied as an elongated pin and one end of the pin intended for contact with the starter handle in the rest position is guided in a guide running perpendicular to the direction of tightening and another end of the pin is hinged to one arm of a lever and another arm of the lever is connected to a pre-tensioned brake cable.

More favourably, the guide is configured as an opening in a cover substantially surrounding the pin. The cover protects the lever and pin from cutting residue.

In a particularly preferred embodiment of the invention, a stop is provided for the fastening section at a distance of the width of said fastening section from the opening. In this embodiment, in the rest position the fastening section is arranged between the opening and stop and thus cannot be moved transverse to the tightening direction. In particular, the pin pressing against the fastening section as a result of the spring pre-tension cannot press the starter handle from its rest position.

BRIEF DESCRIPTION OF THE DRAWINGS

The invention is described with reference to an exemplary embodiment in five figures. In the figures.

DETAILED DESCRIPTION OF THE PREFERRED EMBODIMENT

Figure 1:
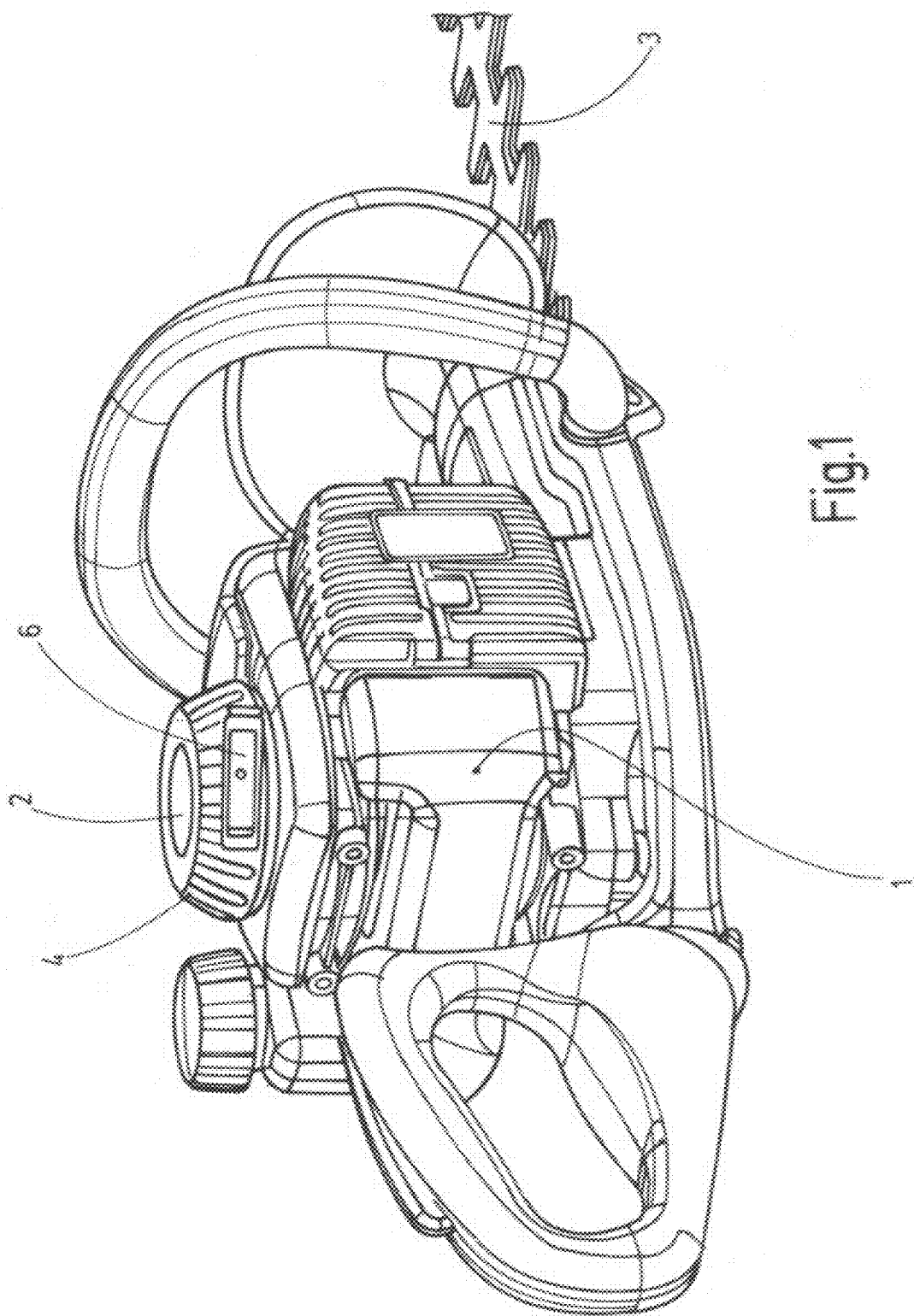
FIG. 1 is a perspective view of a hedge clipper according to the invention.

The hedge clipper shown in FIG. 1 is driven by a two-stroke internal combustion engine 1. The two-stroke internal combustion engine 1 is started with the aid of a cable pull starter 2. The cable pull starter 2 is located on a side facing the user. The hedge clipper has a cutting tool 3 which has two cutters running in opposite directions. The hedge clipper is moved by the user in a cutting direction running parallel to the plane formed by the cutting tool 3.

The cable pull starter 2 comprises a cable drum protected in a housing 4 on which the starter cable can be rolled up and unrolled, one end thereof being securely connected to the cable drum and the other end thereof being in communication with a fastening section 9 of a starter handle 6. The user pulls the starter handle 6 with a jerky movement to start the hedge clipper. The direction of tightening of the starter handle 6 runs parallel to the cutting plane of the hedge clipper. A starting brake (not shown) is provided so that the user is not injured by movements of the cutting tool 3 initiated during the starting process. The starting brake of the hedge clipper prevents cutting movements of the cutting tool 3 which endanger the user. The starting brake is tightened using a tripping mechanism 15 and also released again.

Figure 2:
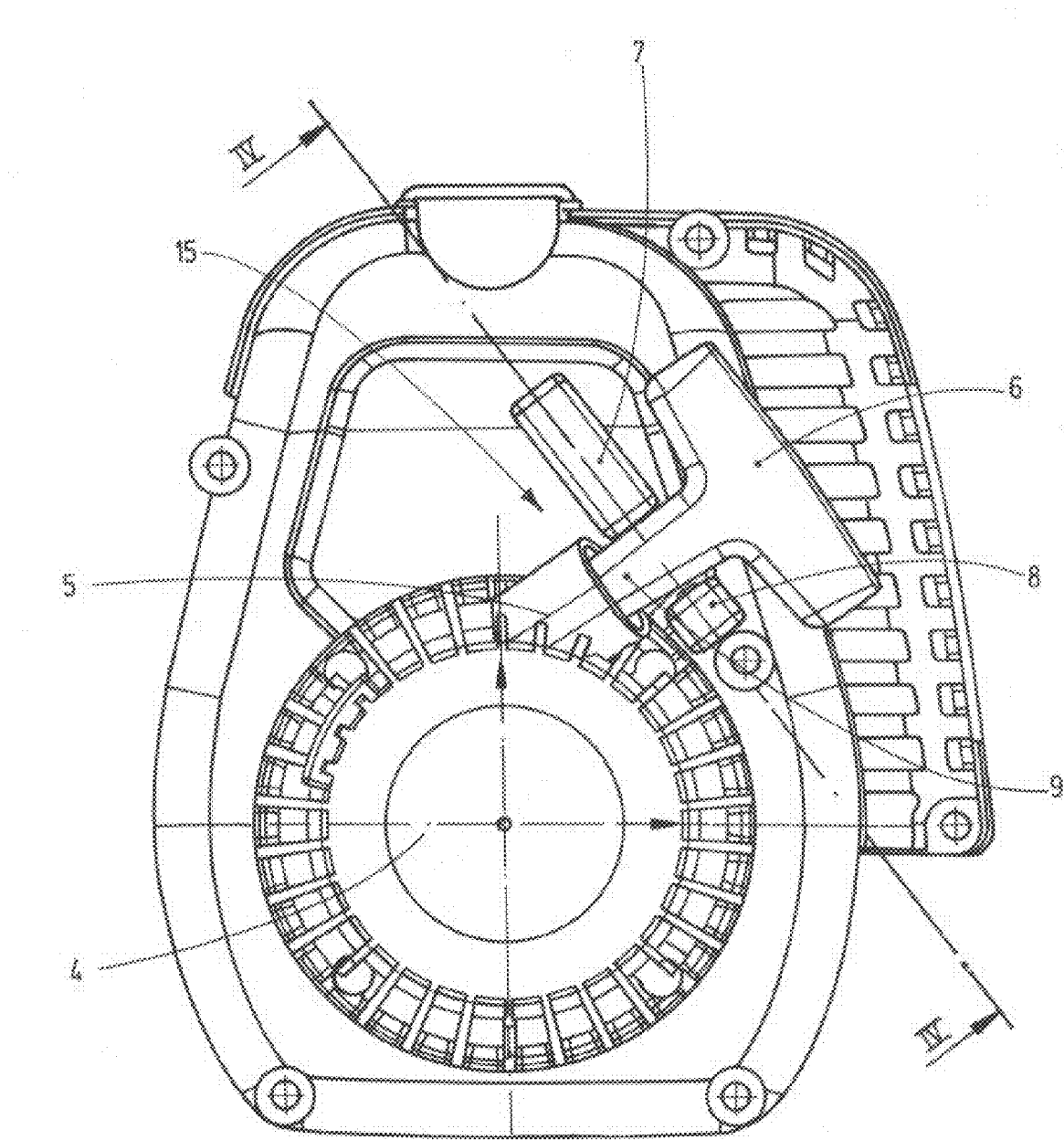
FIG. 2 is a plan view of a part of the hedge clipper in FIG. 1.

FIG. 2 shows the tripping mechanism 15, 11 in the rest position. The starter handle 6 is inserted into a holder 5. In this position, the cutting tool 3 is released by the starting brake (not shown). The tripping mechanism 15, 11 has two opposing parts on the fastening section 9 of the starter handle 6. A slightly larger part located opposite to the housing 4 of the cable drum on the fastening section 9 covers a lever mechanism 13 in a pin 11 and guides the pin 11. In the position according to FIG. 2, the pin 11 is pressed into the cover 7 and pre-tensioned by a spring device 12. In this case, the pin 11 presses against the fastening section 9 of the starter handle 6. A stop 8 which prevents the starter handle 6 from being pressed by the pre-tensioning of the pin 11 towards the housing 4 is provided on the fastening section 9 opposite to the cover 7.

Figure 3:
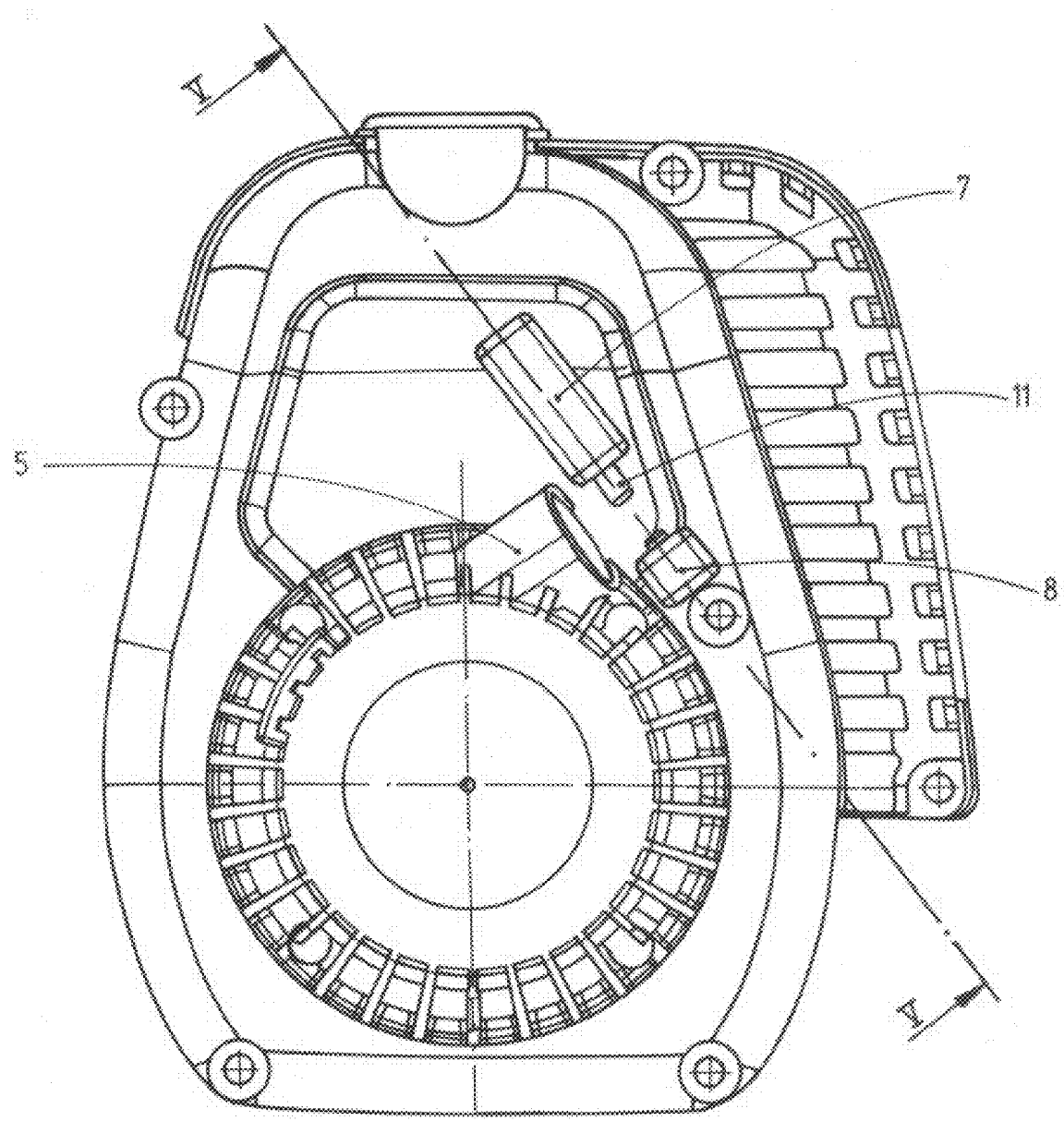
FIG. 3 is a plan view according to FIG. 2 without starter handle.

FIG. 3 shows the tripping mechanism 15, 11 in the starting position. The starter handle 6 is tightened or removed. For starting the hedge clipper, the user withdraws the starter handle 6 from the holder 5 in a jerky movement and the tripping mechanism 15, 11 tightens the starting brake. In the starting position as shown in FIG. 3, the pin 11 is pressed out from the cover 7 by the spring pre-tension of the spring device. The starting brake is tightened by means of a brake cable controller 12 (not shown) located between the pin 11 and the starting brake and prevents dangerous movements of the cutting tool 3 in the starter position.

Figure 4:
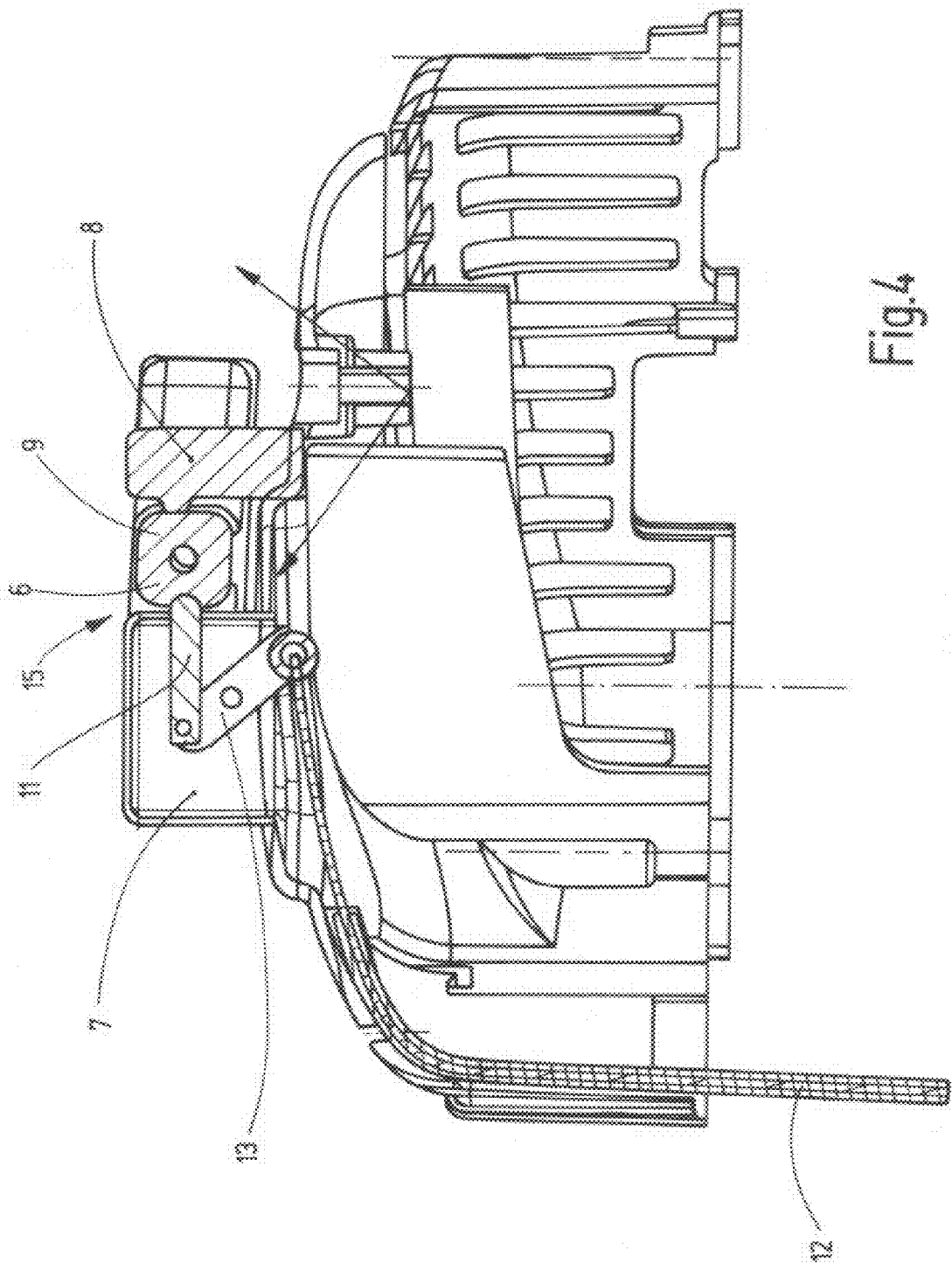
FIG. 4 is a sectional view along the line IV-IV in FIG. 2.

FIG. 4 shows the rest position according to FIG. 2 in side view. After the drive has been started, the starter handle 6 is returned into the holder 5 again. The pin 11 is thereby pressed into the cover 7. As a result of this movement, the cutting tool 3 is released by a brake cable controller 12 again, i.e. the starting brake is released. The brake cable pre-tensions the pin 11 by means of a spring (not shown) via a lever mechanism 13. The fastening section 9 of the starter handle 6 is mounted positively between the cover 7 and the stop 8. At the centre, the fastening section 9 of the starter handle 6 has a recess used to fasten the other end of the starter cable.

Figure 5:
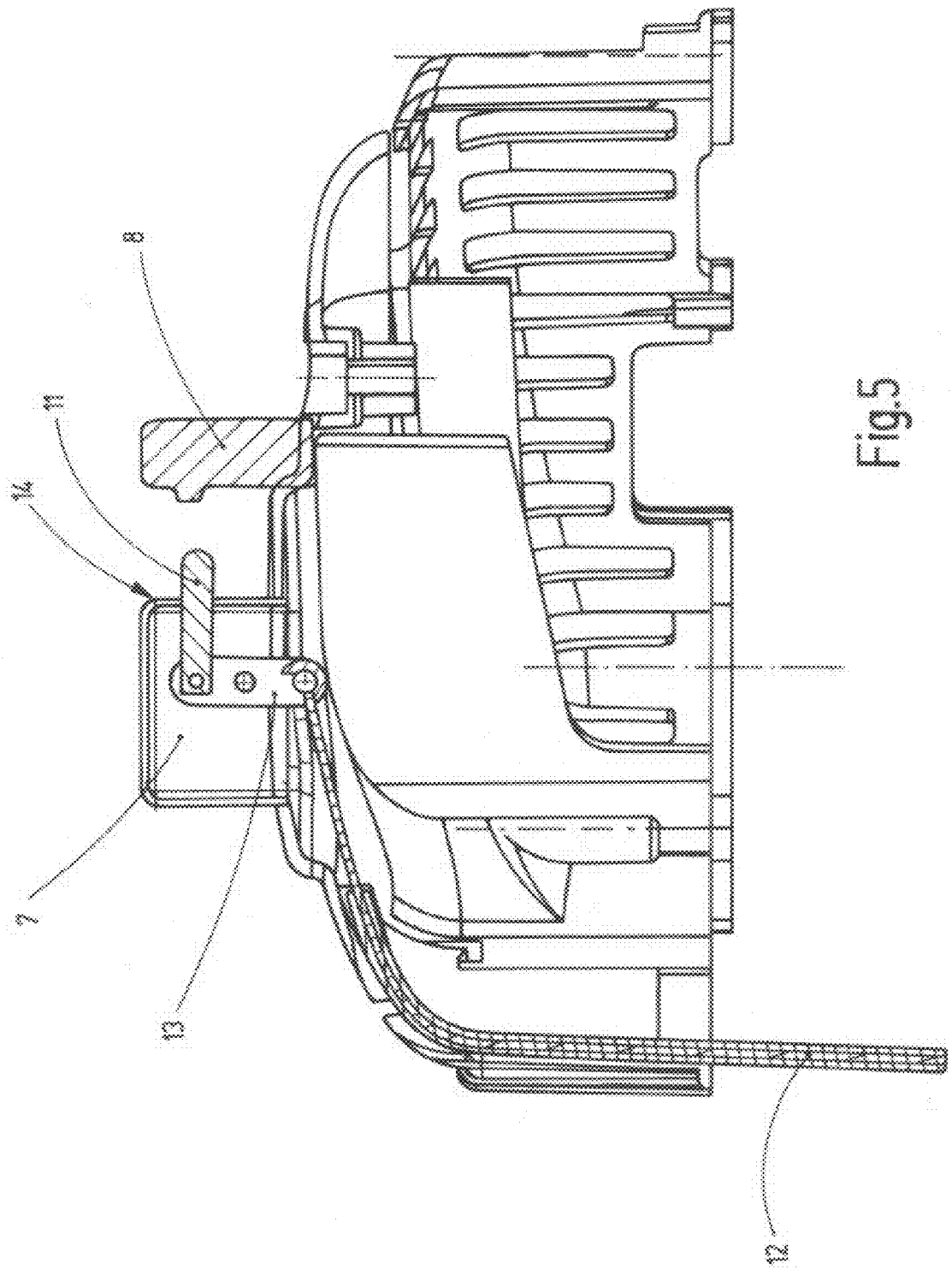
FIG. 5 is a sectional view along the line V-V in FIG. 3.

FIG. 5 again shows the tripping mechanism 15, 11 in the starter position. The end of the pin 11 facing the starter handle 6 is guided in an opening 14 of the cover 7. Another end of the pin 11 is hinged to an arm of a lever 13. The lever 13 is configured as an elongated component which is centrally rotatably mounted. The other lever arm is connected to an end of the brake cable 12 in an articulated manner. This listing of claims will replace all prior versions and listings of claims in the application:

The invention claimed is:

1. A work implement comprising a drive which can be started by a cable pull starter (2), wherein the cable pull starter (2) has a starter handle (6) which is located in a holder (5) in a rest position and which can be removed from the holder (5) by a user for starting the drive and comprising a starting brake for a tool (3) which prevents tool movements hazardous to the user directly after starting the drive, characterised by a tripping mechanism (15) disposed on the holder (5) for the starting brake which by removing the starter handle (6) from the holder (5) automatically tightens the starting brake.

2. The work implement according to claim 1, characterised in that the tripping mechanism (15) automatically triggers the starting brake by returning the starter handle (6) into the holder (5).

3. The work implement according to claim 2, characterised in that the tripping mechanism (15) has an adjusting means (11) which is in the rest position when the starter handle (6) is introduced into the holder (5) and changes into a starter position by withdrawing the starter handle (6) from the holder (5).

4. The work implement according to claim 3, characterised in that in the rest position the adjusting means (11) is pre-tensioned by a spring device (12) in operative connection with said means.

5. The work implement according to claim 3, characterised in that the adjusting means (11) is disposed before the holder (5) in the tightening direction of the starter handle (6).

6. The work implement according to claim 3, characterised in that the adjusting means (11) is embodied as an elongated pin (11) and one end of the pin (11) intended for contact with the starter handle (6) in the rest position is guided in a guide (14) running perpendicular to the direction of tightening and another end of the pin (11) is hinged to an arm of a lever (13) and another arm of the lever (13) is connected to a pre-tensioned brake cable (12).

7. The work implement according to claim 6, characterised in that a longitudinal direction of the elongated pin (11) and the tightening direction of the starter handle (6) are perpendicular to one another.

8. The work implement according to claim 6, characterised in that the guide is configured as an opening (14) in a cover (7) substantially surrounding the pin (11) and the lever (13).

9. The work implement according to claim 8, characterised in that a stop (8) is provided for a fastening section (9) at a distance of the width of said fastening section (9) from the opening (14).

10. The work implement according to claim 9, characterised in that the holder is aligned in such a manner that a longitudinal direction of the fastening section (9) of the starter handle (6) runs on the tightening direction of the starter handle (6) and the stop (8) and the cover (7) are arranged in the tightening direction before the holder (5).

* * * * *